(12) United States Patent
Chirnomas

(10) Patent No.: US 7,817,034 B2
(45) Date of Patent: Oct. 19, 2010

(54) INVENTORY MONITOR FOR AN ARTICLE DISPENSER

(76) Inventor: Munroe Chirnomas, 47 Skyline Dr., Morris Township, NJ (US) 07960

( * ) Notice: Subject to any disclaimer, the term of this patent is extended or adjusted under 35 U.S.C. 154(b) by 413 days.

(21) Appl. No.: 11/814,920

(22) PCT Filed: Jan. 26, 2006

(86) PCT No.: PCT/US2006/003131

§ 371 (c)(1),
(2), (4) Date: Jul. 26, 2007

(87) PCT Pub. No.: WO2006/081520

PCT Pub. Date: Aug. 3, 2006

(65) Prior Publication Data

US 2008/0097803 A1   Apr. 24, 2008

Related U.S. Application Data

(60) Provisional application No. 60/647,103, filed on Jan. 26, 2005.

(51) Int. Cl.
*G08B 13/18* (2006.01)
(52) U.S. Cl. ............... 340/556; 340/539.13; 340/568.1; 340/426.19; 340/578
(58) Field of Classification Search ............... 340/566, 340/539.13, 539.14, 573.4, 573.1, 572.1, 340/568.1, 578, 600, 426.19, 556, 552–555, 340/557, 561, 426.26, 870.28
See application file for complete search history.

(56) References Cited

U.S. PATENT DOCUMENTS

| | | | | | |
|---|---|---|---|---|---|
| 3,665,448 | A | * | 5/1972 | McGlinchey et al. | 340/568.1 |
| 5,714,935 | A | * | 2/1998 | Ryan, Jr. | 340/572.3 |
| 5,838,234 | A | * | 11/1998 | Roulleaux-Robin | 340/572.3 |
| 7,019,644 | B2 | * | 3/2006 | Barrie | 340/539.13 |
| 7,403,119 | B2 | * | 7/2008 | Leyden | 340/568.8 |
| 2002/0118111 | A1 | * | 8/2002 | Brown et al. | 340/573.1 |
| 2004/0208731 | A1 | * | 10/2004 | Evans et al. | 414/268 |

* cited by examiner

*Primary Examiner*—Daniel Previl
(74) *Attorney, Agent, or Firm*—Lawrence C. Edelman, Esq.

(57) ABSTRACT

A monitoring system for developing information data, for use in association with an opening that provides access for removal by a customer of articles stored in an article storage area. In one embodiment, the monitoring system includes a beam forming device adapted to be arranged about the perimeter of the opening so as to form at least one radiation beam that spans the opening. The radiation beam has a position with respect to the opening that is sufficient to detect manual removal by the customer of one or more of the articles from inside the article storage area, by the article and hand of the customer causing a temporary blockage of at least a portion of the radiation beam as the article and hand of the customer pass through the opening. A processing circuit coupled to the beam forming device senses the blockage of the radiation beam, and in response to the sensing, develops the information data.

30 Claims, 3 Drawing Sheets

INVENTORY MONITOR FOR AN ARTICLE DISPENSER

CROSS-REFERENCE TO RELATED APPLICATIONS

A nonprovisional US or PCT patent application claims priority of U.S. Ser. No. 60/647,103, filed Jan. 26, 2005, entitled "Inventory Monitor For An Article Dispenser". The entire disclosure of this patent application is incorporated herein by reference in its entirety.

FIELD OF THE INVENTION

The present invention relates to a method and apparatus for monitoring the removal of articles from an article storage area or merchandiser, and is particularly well adapted to monitoring manual removal of the articles from a self-service merchandiser, such as by use of the hand of a customer. Monitoring the use of an automated means which does the removal of the articles from a storage area is also contemplated.

BACKGROUND OF THE INVENTION

Package distribution companies, such as those that distribute beverages and food items, like ice cream bars, etc., typically have distribution routes that run from a warehouse or other distribution center, to a plurality of retail locations where display/storage cases for the products are located and are periodically refilled by the route driver. It would be desirable for the distributor of the packages, or even some other interested party, such as the manufacturer of the products being sold, to be able to monitor, preferably remotely, the inventory levels and sales patterns of these display/storage cases.

SUMMARY OF THE INVENTION

A monitoring system for developing information data, for use in association with an opening that provides access for manual removal by a customer of articles stored in an article storage area, by using a device near said opening that is able to detect the removal of said articles and for developing data about inventory and other information, which inventory and other information can be also be transmitted to a remote site.

BRIEF DESCRIPTIONS OF THE DRAWINGS

The accompanying drawings, which are incorporated herein and constitute part of this specification, illustrate embodiments and details of the invention, and, together with the general description given above and the detailed description given below, serve to explain the features of the invention.

DETAILED DESCRIPTION OF THE DRAWINGS

Figure 1:
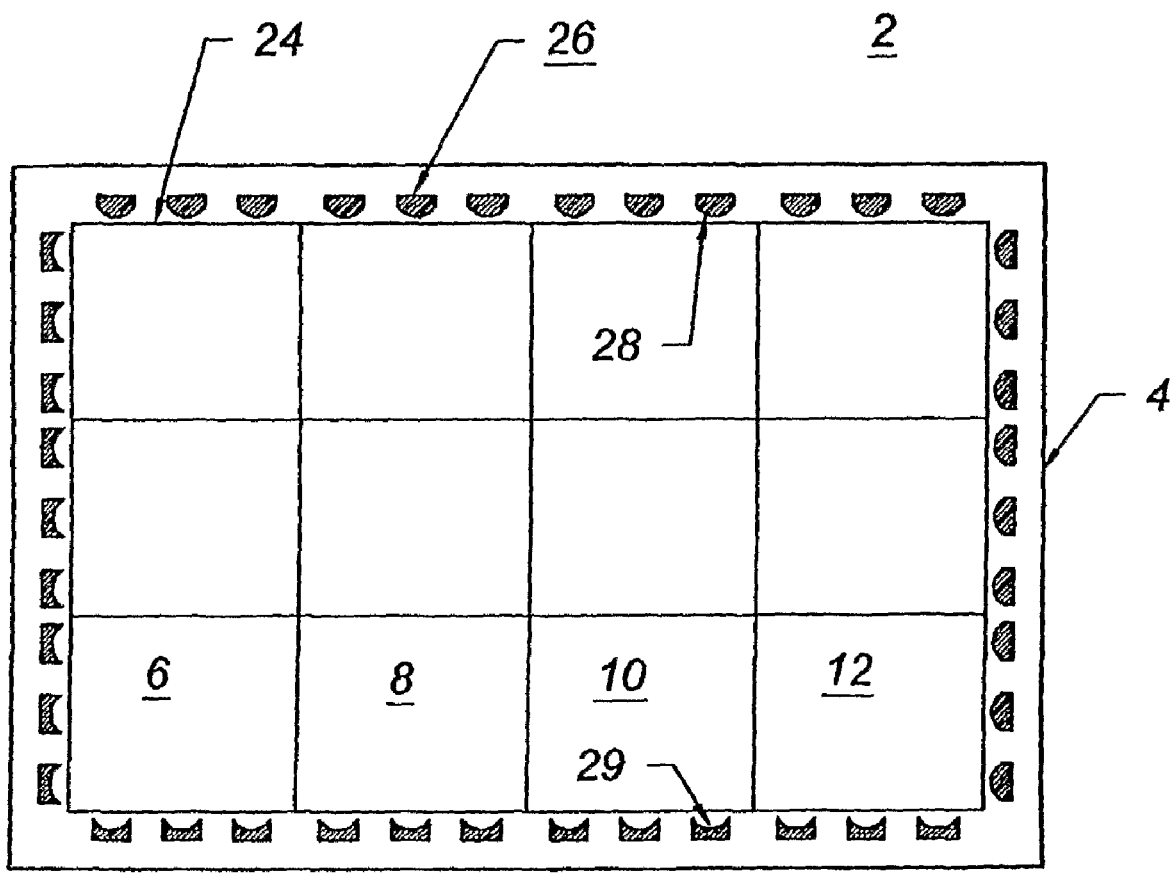
FIG. 1 illustrates a top view of an article dispenser with inventory monitor that is constructed and operates in accordance with the principles of the present invention.
Figure 2:
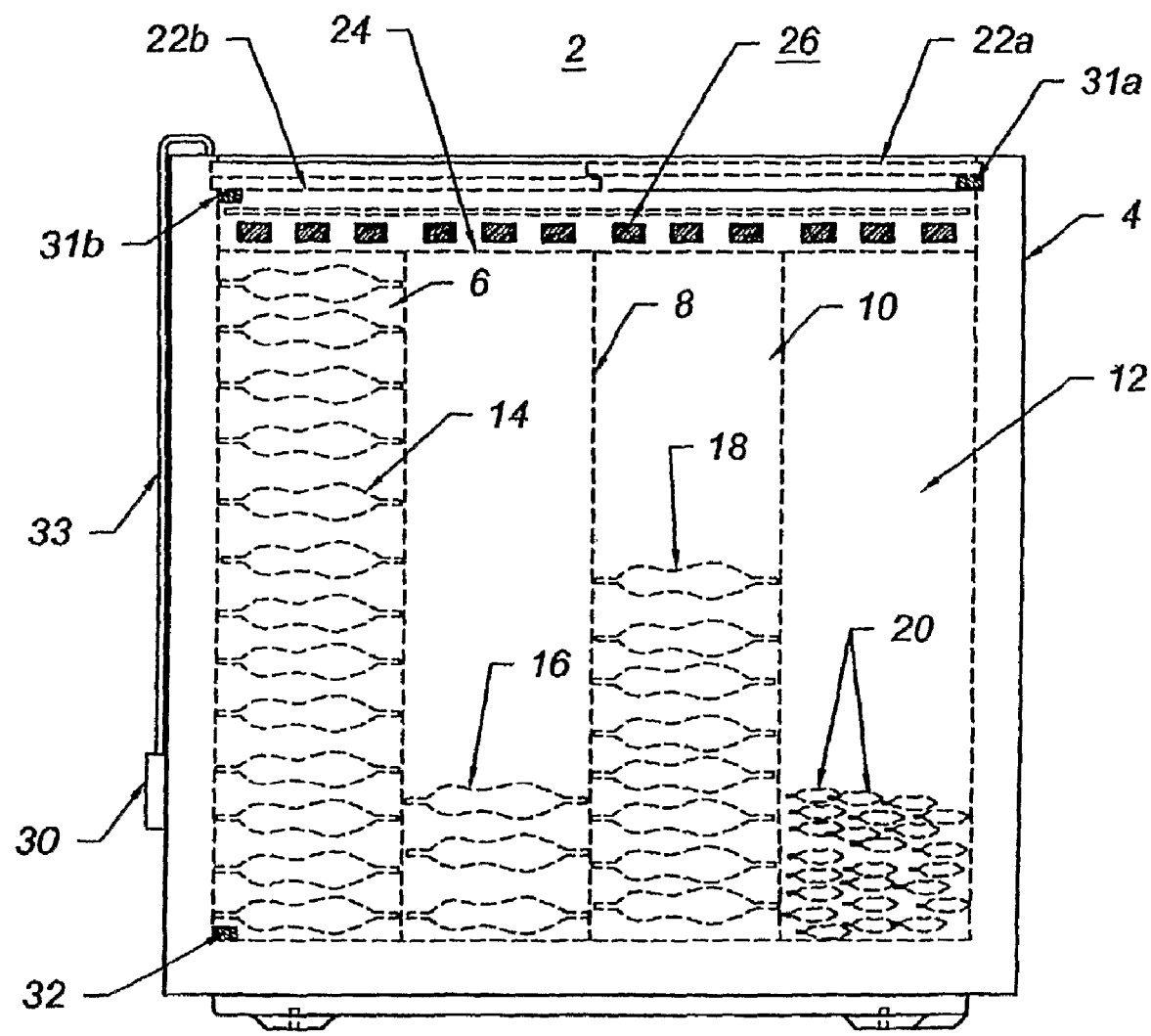
FIG. 2 illustrates a side view of one possible embodiment for the article dispenser of FIG. 1.
Figure 3:
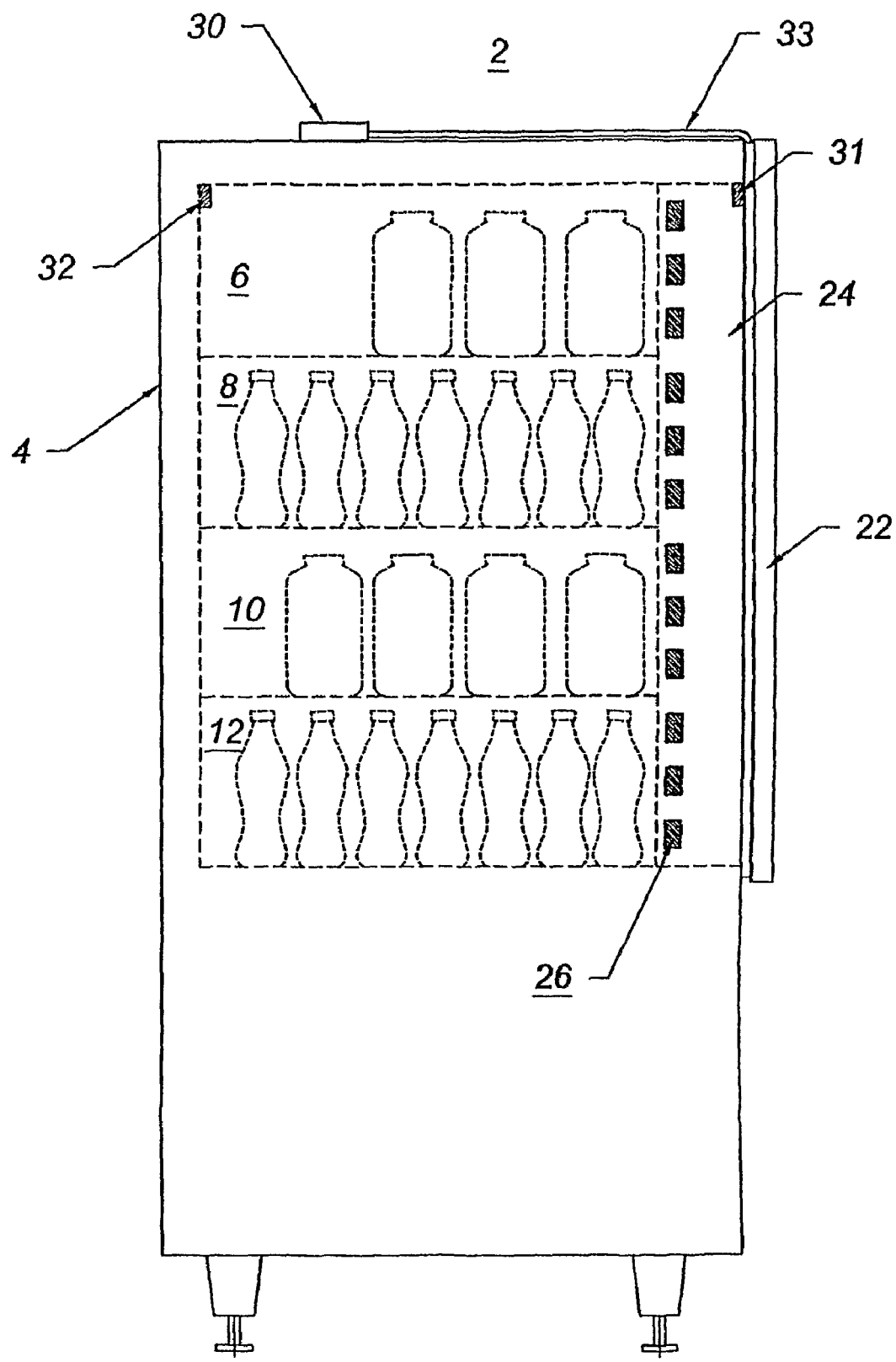
FIG. 3 illustrates a side view of another type of article dispenser with inventory monitor that is constructed and operates in accordance with the principles of the present invention.

FIGS. 1 and 2 show a top and side views, respectively, of a typical display/storage case 2 for dispensing articles to consumers/purchasers. FIG. 3 shows application of the principles of the invention in an environment where the articles are stored on generally horizontal shelves. The display/storage case 2 typically comprises a case 4, which serves as an article storage area, the interior of the case 4 being divided into a plurality of discrete selling locations 6, 8, 10, and 12, such as by using baskets, a matrix of dividers, or shelves (as shown in FIG. 3) where different types of articles 14, 16, 18, 20 to be dispensed are typically positioned for sale. It is noted in some embodiments of the invention, it may be desirable that case 4 include a refrigeration and/or heating unit, not specifically shown, for keeping the articles to be sold in a heated, cooled or even frozen environment. The case 2 may also comprise a "push cart" such as found in an amusement area.

The articles 14-20 stored in the locations 6-12 may be arranged in a stacked and aligned manner, one on top of another, or may be randomly organized, such as shown by the articles shown in location 12. More specifically, although only a side view is shown in FIGS. 2 and 3, and it may appear that the articles are stacked one on top of another in vertically aligned bins having a shape corresponding closely to the shape of the articles stored therein, when viewed from the front, it may be seen that some of the locations may be wide enough to hold the width of more than one of the articles stored in that location. For example, location 12 is shown to be wide enough so that a plurality of articles 20 may appear to be randomly positioned therein.

Case 2 typically has a lid, such as a sliding cover having doors 22a and 22b that typically overlap each other, and are made of a clear material such as glass or plastic, that cover a customer access opening 24. As described so far, the display case is typically used by a customer by the customer looking into the case to see what they want, and then sliding the door open, reaching through the opening 24 and into one of the locations 6-12, and manually removing one or more of the articles 14-20 with their hand. This invention could also work well with a cabinet having no door. As previously noted, it would be desirable for many reasons, to monitor such removal of articles.

In accordance with one aspect of the present invention, a beam forming device 26 is arranged about the perimeter of the opening 24. The device may include a flexible or rigid circuit board having an array of transmitters and/or receivers in an amount sufficient to form radiation beams that span the opening 24 with a beam density sufficient to cause a beam to be blocked by the hand of the customer when the hand enters a location 6-12 to remove a selected one or more of the articles stored therein, and/or when the article is being removed.

In an alternative embodiment, the transmitters and receivers could be individually positioned about opening 24. The transmitters and receivers can be adhered (using glue, screws, magnets, etc) to the inside walls of the case 2 about the perimeter of opening 24 in a location that is just above the tops (dispensing end) of the locations 6-12. If positioning close to the tops of the locations is not possible, then the use of "extensions" on top of whatever devices/structures, such as wire baskets or shelving, are used to form the locations, would be used so as to "extend" the dispensing end of the structures to a position near the beam forming device 26. If the transmitters and receivers are located along opposite sides could each include one of a line of transmitters 28 (such as LEDS), and a line of receivers 29. Other arrangements are possible, such as alternating transmitters and receivers, in a one to one relationship or other relationship (even including reflectors in place of some transmitters), so that multiple beam paths "span" the locations 6-12 with enough density so that the users hand entering a location will temporarily block at least one beam, so as to identify a location 6-12 (possible a matrix only one beam wide would be needed if there were only a 1×N matrix of storage locations.

A control unit 30 is connected to the device 26 for providing operating power thereto, as well as for detecting and processing the signals received therefrom so as to develop information data. Detection of the temporary blockage, and time of the blockage of the beams can be first and second types of information data, and the use of door open/close sensors 31*a*/31*b* positioned adjacent the ends of doors 22*a*/22*b*, respectively, can sense a third data type, and temperature sensor 32 a fourth data type. Control unit 30 can include a processing circuit to develop the information data, and a communication device (which can be wired or wireless) to send that data to a remote location, as described in more detail in the following paragraph. A wire cable 33 can supply the electrical connection between the sensors, beam formers and the control unit 30. Instead of a wireless or wired transmission of the information data to the remote location, the information data can also be gathered locally by the route operator using a hand held device, such as a PDA (a personal digital assistant device).

As noted above, the information data can be sent to a remote location. At the remote location, the data can be analyzed to determine the inventory status of the storage area. The information data can be analyzed at the remote location to determine patterns of use of the storage area. The patterns of use may be one or more of: multiple purchases of the same type article, most likely multiple purchases (such as one chocolate ice cream and one vanilla ice cream), amount of time from when door opened to when an article is selected and removed.

Control unit 30 also includes a memory (not specifically shown) for storing the information data, and the processing circuit is coupled to a communication device (also not specifically shown, but included in unit 30) which is adapted to transmit the information data to a first remote location.

The first remote location may be located relatively near to the article storage area, so that the first remote location acts as a relay link for receiving information data from one or more of the monitoring systems, and then periodically transmits the received information data to a database at a second remote location, located substantially further from the article storage area than the first remote location. The communication device may use a local area network for transmitting the information data to the first remote location, using either a wireless or wired communication system, which can be either one-way or bi-directional.

In one embodiment, for transmitting the information data to the first remote location, a wireless communication system would use a public band radio frequency band adapted for relatively short range communication, such as the 900 mHz, or 2.4 gHz frequency bands. The communication device can also use a wireless or wired communication system for transmitting the information data to a second remote location, located remotely from the first location. For example, the first location may be in or near where a cluster of the merchandisers are located which have the inventive monitoring system, and the second remote location may be much more remote. For transmitting the information data to the second remote location the wireless communication system may be one of a wireless cellular communication system, a wired telephone communication system, such as a standard telephone or facsimile line, or a wired or wireless Internet-based communication system.

The second remote location includes one of a mobile location corresponding to a inventory supply delivery truck and/or a fixed location inventory supply storage and distribution facility.

Although the customer may typically only remove one article with each "reaching" into a location 6-12, it is possible that multiple articles will be removed, especially if the articles are small compared to the grasp of the customer. Such a condition is shown for the articles 20 shown in location 12. With respect to this situation, where multiple articles maybe removed, the present invention considers that the route operator will develop historical data of the actually sales of the articles, and when that data is compared to the data about how many beams and which beams were broken, and analysis can be performed to determine, for example, that on the average, for location 12, 1.1 articles are removed for each hand detected.

In alternative embodiments, the data gathered processed so that the monitoring system of the invention can be used as an anti-pilferage monitoring device, so as to assist the owner of, for example a push-cart type merchandiser, that the operator of the push cart is not distributing product without collecting the proper revenue.

In a further alternative embodiment, the sensing transmitters/receivers can be directly mounted on the baskets/shelves.

If the owner of the storage device allows, a monitoring device such as this can be used to monitor the amount of sales of a competitors product being sold out of the storage device.

By monitoring the timing and/or sequence of the openings of any doors over the openings of the merchandiser or in conjunction with the information regarding identification of which item was retrieved by the customer, this data can be processed.

Additionally, part of the data that is gathered by the processor of control unit 30 is a "time stamp" that indicates the time of day that the beams were broken, and therefore indicates the time that the consumer retrieved the product. Such data provides useful marketing information to the operator and/or owner of the merchandiser, as well as the various manufactures of the items being sold therefrom.

While the present invention has been disclosed with reference to certain embodiments, numerous modifications, alterations and changes to the described embodiments are possible without departing from the sphere and scope of the present invention, as defined above, and in the following claims.

For example, although in the above described embodiments the users hand is used for removing the articles, an automatic means, such as a robotically controlled article dispenser, such as shown in the inventors U.S. Pat. No. 6,868,983 could be used.

In another embodiment the perimeter sensors can also include Radio Frequency Identification Detection devices (RFID), used in association with the beam detectors.

Accordingly, it is intended that the present invention not be limited to the described embodiments, but that it has the full scope defined by the above language and the following claims, as well as equivalents thereof.

The invention claimed is:

1. A monitoring system for developing information data, for use in association with an opening that provides access within a perimeter of said opening for manual removal by a customer of articles stored in an article storage area, comprising:

a beam forming device adapted to be arranged about the perimeter of said opening so as to form at least one radiation beam that spans said opening, said radiation beam having a position with respect to said opening sufficient to detect manual removal by said customer of one or more of said articles from inside the article storage area, by at least one of said article and said hand of said customer causing a temporary blockage of at least a portion of the radiation beam as said article and hand of said customer pass through said opening; and a processing circuit coupled to the beam forming device for sensing the blockage of said radiation beam, and in response to said sensing developing said information data.

2. The monitoring system of claim 1, where the information data is representative of the inventory condition of the article storage area from which the article was removed.

3. The monitoring system of claim 1, adapted for use in a manual or automatic article dispenser, wherein:

the beam forming device forms a matrix of a plurality of radiation beams that span said opening, said matrix of radiation beams having a beam density across said opening sufficient to prevent an article from being removed from inside the article storage area and to pass through said opening without said article causing a blockage of the radiation in at least two of said beams;

said processing circuit is coupled to the radiation beam matrix forming device for sensing the blocking of said radiation beams, and in response to said sensing, developing information data that identifies the storage position in the article storage area from which the article was removed.

4. The monitoring system of claim 3, wherein said opening is generally rectangular, and has first and second opposed pairs of sides, and the beam forming device includes on each side of said opposed pairs, electronic a plurality of devices, selective ones of which either transmit or receive radiation.

5. The monitoring system of claim 3, wherein the beam forming device includes a plurality of radiation transmitters and a corresponding plurality of radiation receivers.

6. The monitoring system of claim 3, wherein one of each side of said opposed pairs of sides of said beam forming device includes only electronic devices that transmit radiation and the other of each side of said opposed pairs of sides of said beam forming device includes only electronic devices that receive radiation.

7. The monitoring system of claim 3, wherein the beam forming device is adapted to be a retrofitted part to be affixed about the opening to the article storage area of a self-serve merchandiser.

8. The monitoring system of claim 3, wherein said article storage area includes storage devices that divide the opening in the storage area into a plurality of individual storage locations, each storage location having a dispensing end from which said articles are removed during dispensing, and said beam forming device is adapted to be affixed inside said article storage area so as to overlay said opening in close proximity to the dispensing ends of said storage locations.

9. The monitoring system of claim 8, wherein said storage devices include extending devices adapted to extend the position of the dispensing end of the storage devices from a position not in close proximity to the beam forming device, to be in a position in close proximity to the beam forming device.

10. The monitoring system of claim 3, wherein said beam forming device is adapted to be used in an article storage area having a cooling means which keeps the articles stored therein in a cold environment.

11. The monitoring system of claim 3, wherein said beam forming device includes at least one heating device which heats said radiation transmitters and/or receivers in order to inhibit the formation of condensation or frost thereon.

12. The monitoring system of claim 3, wherein said beam forming device also includes a sensor coupled to said processing circuit for developing information data representative of the opening of an access door, said access door normally positioned over said opening so as to substantially shield the inside of said article storage area from the local environment.

13. The monitoring system of claim 12, further including an alarm signal, developed in responsive to the sensing of said access door being in an opened position for greater than an preset period of time.

14. The monitoring system of claim 13, wherein said processing circuit develops said alarm signal, said alarm signal being used to activate an alarm that is located in close proximity to said article storage area.

15. The monitoring system of claim 3, wherein said beam forming device also includes a sensor coupled to said processing circuit for developing information data representative of temperature inside of said article storage area.

16. The monitoring system of claim 3, wherein said beam forming device also includes one or more sensors coupled to said processing circuit for developing information data representative of one or more operative conditions of said article storage area.

17. The monitoring system of claim 16, wherein said operative condition includes one or more of the presence or absence of operating power connected to said article storage area, a temperature in said article storage area, the current status of a door that covers the opening in the article storage area, the status of a health sensor, and the time of occurrence of one or more of the sensed conditions.

18. The monitoring system of claim 3, further including a communication device coupled to said processing circuit, said processing circuit adapted to use the communication device to transmit said information data to a location remote from said article storage device.

19. The monitoring system of claim 18, where said information data is analyzed at said remote location to determine the inventory status of said storage area.

20. The monitoring system of claim 19, where said information data is analyzed at said remote location to determine patterns of use of said storage area.

21. The monitoring system of 20, wherein said patterns of use are one or more of: multiple purchases of the same type article, most likely multiple purchases (such as one chocolate ice cream, and one vanilla ice cream), amount of time from when door opened to when an article is selected and removed.

22. The monitoring system of claim 18, wherein said communication device uses a local area network for transmitting said information data to said first remote location, using either a wireless or wired communication system.

23. The monitoring system of claim 22, wherein for transmitting said information data to said first remote location said wireless communication system uses a public band radio frequency band adapted for relatively short range communication, such as the 900 mHz, or 2.4 gHz frequency bands.

24. The monitoring system of claim 3, wherein said beam forming device also includes a memory for storing said information data, said processing circuit being coupled to a communication device and adapted to transmit said information data to a first remote location.

25. The monitoring system of claim 24, wherein said first remote location is located relatively near to said article storage area, so that said first remote location acts as a relay link for receiving information data from one or more of said monitoring systems, and then periodically transmits said received information data to a database at a second remote location, located substantially further from said article storage area than said first remote location.

26. The monitoring system of claim 25, wherein said communication device uses a wireless or wired communication system for transmitting said information data to said second remote location.

27. The monitoring system of claim 26, wherein for transmitting said information data to said second remote location said wireless communication system uses one of a wireless cellular communication system, a wired telephone communication system, such as a standard telephone or facsimile line, or a wired or wireless Internet-based communication system.

28. The monitoring system of claim 27, wherein said second remote location includes one of a mobile location corresponding to a inventory supply delivery truck and/or a fixed location inventory supply storage and distribution facility.

29. The monitoring system of claim 1, further including a thermal barrier positioned across said opening so as to provide a thermal separation between the environment where the articles are stored in said storage area, and said beam forming device.

30. The monitoring system of claim 29, wherein said thermal barrier comprises a plurality of flexible fingers which are relatively easily deflected so as to allow the passage of the customers hand and/or an article therethrough, yet have a normal, unflexed, position which substantially prevents air flow into and out of the inside of the article storage area.

* * * * *